(12) United States Patent
Pedersen et al.

(10) Patent No.: US 9,022,659 B2
(45) Date of Patent: May 5, 2015

(54) ARRANGEMENT TO CONTROL THE CLEARANCE OF A SLIDING BEARING

(71) Applicant: Siemens Aktiengesellschaft, München (DE)

(72) Inventors: Bo Pedersen, Lemvig (DK); Kim Thomsen, Ikast (DK)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 14/249,556

(22) Filed: Apr. 10, 2014

(65) Prior Publication Data

US 2014/0321781 A1     Oct. 30, 2014

(30) Foreign Application Priority Data

Apr. 26, 2013   (EP) ..................... 13165508

(51) Int. Cl.
*F16C 37/00* (2006.01)
*F03D 11/00* (2006.01)
*F16C 17/24* (2006.01)

(52) U.S. Cl.
CPC ............ *F03D 11/0008* (2013.01); *F16C 37/00* (2013.01); *F16C 17/243* (2013.01); *Y10S 384/90* (2013.01)

(58) Field of Classification Search
USPC .......................... 384/313, 315–317, 321, 900
See application file for complete search history.

(56) References Cited

U.S. PATENT DOCUMENTS 1,473,827 A    11/1923   Mills
4,602,874 A *  7/1986   Neugebauer ................. 384/321
5,192,139 A *  3/1993   Hiramoto et al. ............. 384/476
6,913,390 B2 * 7/2005   Inoue et al. ................... 384/321
2002/0051723 A1  5/2002   Kasai et al.

FOREIGN PATENT DOCUMENTS

DE    20017997 U1    2/2001
EP    2520797 A1    11/2012
EP    2524136 B1    3/2014

OTHER PUBLICATIONS

European Search Report; Application No. 13165508.6; Mail Date: Oct. 2, 2013; Siemens Aktiengesellschaft; 5 pgs.

\* cited by examiner

*Primary Examiner* — Thomas R Hannon
(74) *Attorney, Agent, or Firm* — Schmeiser Olsen & Watts LLP

(57) ABSTRACT

An arrangement to control the clearance of a sliding bearing is disclosed. A sliding bearing arrangement, of a direct driven wind turbine, comprises a bearing. The bearing comprises a first bearing shell and a second bearing shell, whereby the first bearing shell and the second bearing shell are arranged rotatable in respect to each other. A certain predetermined clearance is present between the first bearing shell and the second bearing shell, while the bearing is in rotation. A first circuit comprises a first fluid, while the first circuit is in thermal contact with the first bearing shell. A second circuit comprises a second fluid, while the second circuit is in thermal contact with the second bearing shell. The first circuit and the second circuit are coupled in a way that a difference in the temperature between the first bearing shell and the second bearing shell is compensated via the first and the second fluid, thus the clearance is kept within a predetermined range.

15 Claims, 7 Drawing Sheets

ARRANGEMENT TO CONTROL THE CLEARANCE OF A SLIDING BEARING

CROSS-REFERENCE TO RELATED APPLICATIONS

This application claims priority to EP 13165508 filed on Apr. 26, 2013, the entire contents of which are hereby incorporated by reference.

FIELD OF TECHNOLOGY

The disclosed relates to an arrangement to control the clearance of a sliding bearing.

BACKGROUND

Bearings are built as rolling element bearings or as plain bearings. A plain bearing, or sliding bearing, is also known as a hydrodynamic bearing, a hydrostatic bearing or a hybrid bearing.

The contact surface between a rolling element and a bearing shell is very small. In an arrangement, where higher loads act and higher moments have to be transferred over the bearing, rolling element bearings are not sufficient.

In such arrangements, plain bearings are applied. Plain bearing or sliding bearings are capable to transfer higher loads than rolling element bearings.

In a direct driven wind turbine rotor of the electrical generator is directly coupled with the rotor of the wind turbine. The stator of the electrical generator is attached to the stationary part of the wind turbine. Thus the rotor and the stator of the electrical generator are rotatable connected via the main bearing of the wind turbine.

In direct driven wind turbines a main bearing is connecting the rotor of the wind turbine with the stationary part of the wind turbine.

The main bearing of the direct driven wind turbine has to transfer high loads. As wind turbines are increased in size, and also in rotor diameter, sliding bearings are used as a main bearing.

The air gap between the rotor and the stator of the electrical generator depends on the parameters of the bearing. Especially the clearance of the bearing has a high influence on the width of the air gap of the electrical generator.

When the clearance of the main bearing is too high, the tolerance in the air gap is very high. This might lead to a contact between the rotor and the stator and thereby to damages in the electrical generator of the wind turbine.

When the clearance of the main bearing is too low, layer of lubrication might not have a sufficient thickness and the friction in the bearing is too high. This results in damages in the bearing and a reduced live-time of the bearing components.

A too low clearance in the bearing causes a rise in the temperature of the bearing components due to higher friction. In addition it reduces the circulation and exchange of the lubricant in the bearing.

Thus the clearance of the main bearing has to be kept within a certain predetermined range of values to prevent damages.

The clearance of the bearing is highly influenced by the temperature of the bearing components. Most bearing shells are of metal materials, which show a certain expansion at increasing temperatures.

During the start-up of a wind turbine, for example, the lubricant in a sliding bearing is not provided as a film of lubricant. The film of lubricant is built up by the rotation of the bearing. In this case, the friction in the bearing is very high at the start-up of a wind turbine. The friction is generating heat.

The bearing shells in the bearing show a different constructional shape, mass and surface area. Due to this, one of the bearing shells will experience a faster increase in temperature during the start-up of the wind turbine.

This leads to a different expansion of the bearing shells. Due to that the clearance between the bearing shells will change.

To keep the clearance of the bearing within a predetermined range, it is known to measure the temperature of the bearing components. According to the value of the temperature of the bearing components the components are cooled or heated to keep the bearing at a constant operational temperature.

To achieve this, cooling systems, like water cooling or oil cooling systems are used to keep the bearing shells at a certain predetermined temperature.

This shows the disadvantage that the reaction of the cooling system on the temperature measured is slow and that the cooling system consumes a high amount of energy for cooling the bearing shells to a certain predetermined temperature.

SUMMARY

It is the aim of the disclosed to provide an improved method to control the clearance of the bearing.

The aim is reached by the subject matter according to the independent claims. Preferred embodiments of the invention are described in the dependent claims.

A sliding bearing arrangement of a direct driven wind turbine, comprises a bearing, with a first bearing shell and a second bearing shell. The first bearing shell and the second bearing shell are arranged rotatable in respect to each other.

A certain predetermined clearance is present between the first bearing shell and the second bearing shell, while the bearing is in rotation.

A first circuit comprises a first fluid, while the first circuit is in thermal contact with the first bearing shell. A second circuit comprises a second fluid, while the second circuit is in thermal contact with the second bearing shell.

The first circuit and the second circuit are coupled in a way that a difference in the temperature between the first bearing shell and the second bearing shell is compensated via the first and the second fluid, thus the clearance is kept within a predetermined range.

A sliding bearing or plain bearing is a hydrostatic, a hydrodynamic or a hybrid bearing, which is a combination of hydrostatic and hydrodynamic.

In a direct driven wind turbine the rotor of the wind turbine is directly coupled to the rotor of the electrical generator. The rotation is not transferred by a gearbox.

The rotor of the wind turbine and the rotor of the electrical generator are coupled to the stationary part of the wind turbine via a bearing arrangement. The bearing arrangement comprises a main bearing. In addition, it is possible use a second bearing. It is also possible to use two bearings in parallel.

The bearing arrangement has to transfer radial forces, axial forces and tilting moments. The bearing arrangement comprises therefore sliding surfaces that are capable to transfer radial forces, axial forces and tilting moments.

Often tapered bearings are used.

Also bearings with a radial and one or two axial sliding surfaces are used.

The bearing arrangement comprises at least one bearing. The bearing comprises a first bearing shell and a second bearing shell. The bearing comprises a rotatable bearing shell and a stationary bearing shell. The rotatable bearing shell rotates in respect to the stationary bearing shell.

The first bearing shell comprises a sliding surface that faces the sliding surface of the second bearing shell. When the bearing is in rotation the sliding surfaces of the first and the second bearing shell slide along each other.

To prevent excessive heat and damages to the bearing, lubrication is used between the sliding surfaces of the bearing shells.

A certain predetermined clearance between the first and the second bearing shell is needed, to allow a certain thickness of the layer of lubricant between the bearing shells.

If the clearance is too low, the layer of lubricant might break. This leads to a direct contact of the sliding surfaces of the bearing shells and therefore to the development of excessive heat and to damages in the bearing.

When the clearance is too high, the tolerance in the bearing is too high, which can lead to severe damages in the generator of the wind turbine.

Therefore it is important to keep the clearance in a certain range.

A first circuit is attached to the first bearing shell. A first fluid is circulating in the first circuit. The fluid is used to influence the temperature of the first bearing shell. The bearing shell is cooled or heated by the first fluid in the first bearing shell.

A second circuit is attached to the second bearing shell. A second fluid is circulating in the second circuit. The fluid is used to influence the temperature of the second bearing shell. The bearing shell is cooled or heated by the second fluid in the second bearing shell.

The first circuit and the second circuit are coupled in a way that a difference in the temperature between the first bearing shell and the second bearing shell is compensated via the first and the second fluid.

The bearing is made of metal. Metal expands when it gets warm. Therefore, a bearing shell will expand due to a higher temperature.

The bearing shells will expand differently, when one shell is warmer than the other. The clearance in the bearing is too high, when the outer bearing shell is warmer than the inner bearing shell. The clearance between the bearing shells is too low, when the inner bearing shell is warmer than the outer bearing shell.

The bearing shells will expand by the same factor, when they have the same temperature. Thus the clearance between the bearing shells is within the predetermined range when the bearing shells have the same temperature.

Thus the clearance between the bearing shells is mainly independent from the absolute temperature of the bearing. Thus it is not necessary to keep the bearing at a certain absolute temperature. Thus it is sufficient to compensate any difference in the temperature between the first and the second bearing shell.

Thus it is not necessary to cool the whole bearing to a certain predetermined temperature. Thus less energy is needed to control the temperature of the bearing. In addition fewer arrangements, like cooling systems, are needed to control the temperature of the bearing.

The first circuit and the second circuit are coupled by a connection thus the first fluid flows from the first circuit to the second circuit and back to the first circuit, while the second fluid flows from the second circuit to the first circuit and back to the second circuit.

The first circuit and the second circuit are coupled to form one combined circuit. The first fluid and the second fluid flow as one common fluid through the first and the second circuit.

Thus the difference in the temperature between the first bearing shell and the second bearing shell is fast and directly compensated. Thus fewer pipes are needed, and fewer pumps are needed.

To transfer the fluid to the rotating shell of the bearing, a rotary unit is used, as known by the specialist skilled in the art.

The first circuit is coupled to the second circuit via the third circuit thus the difference in the temperature of the first fluid and of the second fluid is compensated by the third fluid.

The third circuit connects the first circuit and the second circuit. In a first area the third circuit is in contact with the first circuit, so that heat is transferred between the first and the third fluid or vice versa. In a second area the third circuit is in contact with the second circuit, so that heat is transferred between the second fluid and the third fluid or vice versa.

The fluid in the third circuit flows from the first area to the second area and back to the first area. So heat is transported from the first area to the second area by the third fluid.

The fluid flows back from the second area to the first area in the third circuit. Thus heat is transferred from the second area to the first area.

Thus the heat is transferred from the first circuit to the second circuit or from the second circuit to the first circuit by the third circuit.

Thus the difference in the temperature between the first and the second bearing shell is compensated via the third circuit.

The third circuit is used to connect two or more cooling/heating circuits. The cooling/heating circuits at the bearing shells are kept as local circuits and the third circuit is used to transport the heat over the distance between the cooling/heating circuits.

Thus the fluids are separated. Thus different fluids are used depending on the needs, like the amount of thermal energy transported for example or the electrical insulation capability.

Thus the third circuit is equipped with pipes in a different diameter then the first and the second circuit. Thus space at the bearing is used more effectively and the cooling or heating is optimized.

The rotary unit used to transfer a fluid between the rotatable part of the wind turbine and the stationary part, is arranged within the third circuit. Thus a fluid is used in the third circuit that is optimized to be transferred through a rotary unit.

The first circuit and the second circuit are coupled via a heat exchanger to the third circuit to transfer the thermal energy of the first fluid and of the second fluid to the third fluid.

A heat exchanger is used to connect the first, the second and the third circuit. Thus the difference in the temperature between the first and the second fluid is compensated within the heat exchanger.

The third fluid is used to remove excessive heat from the first and the second circuit for example. Thus the amount of heat in the first and the second circuit is reduced or enhanced by the third circuit. Thus the first and the second circuit are cooled or heated by the third circuit.

Thus the difference in the temperature between the first and the second circuit is compensated and in addition the level of the temperature in the bearing shells is influenced.

Thus the bearing is heated before the start of the wind turbine, to allow a better distribution of the lubrication in the bearing for example.

The fluid is water, air, oil or a gaseous medium.

Different fluids are used in the circuits. The fluids are selected according to the properties of the fluid, like the thermal capacity of the fluid.

Water is a cheap and overall available cooling fluid. In the case of a fault when water is leaking out of the circuit and out of the wind turbine, water is not a problem for the environment around the wind turbine.

Air is also available everywhere. In the case of a leakage air will not cause a problem with electrical installations or will not stain the wind turbine or pollute the environment.

Oil is a very good cooling fluid as it has a high thermal capacity.

The third circuit comprises a cooler, which is arranged and prepared to cool the third fluid.

Thus the third fluid in the third circuit is cooled. Thus the first and the second fluid in the first and the second circuit are cooled by the third fluid.

Thus the common temperature of the first and the second bearing shell is lowered by the third circuit.

The bearing is arranged within the nacelle of the wind turbine and the cooler is arranged outside of the nacelle, while the cooler is arranged and prepared to cool the third fluid by an ambient airflow.

The bearing connects the rotatable part of the wind turbine with the stationary part of the wind turbine. The bearing is located within the housing of the wind turbine, thus within the nacelle.

The third circuit connects the first and the second circuit with the cooler. The cooler is arranged outside of the nacelle. The cooler is cooled by ambient air. Thus the heat from the first and the second circuit, thus from the first and the second bearing shell is transferred to the cooler and removed by the ambient air.

The cooler is located on top of the nacelle or at the side of the nacelle, for example. The wind blowing along the nacelle blows through the cooler and removes the heat.

Thus the heat is not trapped within the nacelle.

The clearance of the bearing is measured by a sensor.

Thus the clearance between the first and the second bearing shell is detected by the sensor. The clearance is measured and analyzed. Thus the transfer of heat from the first bearing shell to the second bearing shell, or vice versa, is controlled according to the measurement of the clearance in the bearing.

Thus the transfer of heat is optimized, and energy, for a pump for example, is saved.

The sensor measuring the clearance is an eddy current sensor, a mechanical proximity sensor, an ultrasonic sensor, a photoelectric sensor, an opto-electronic sensor, a capacitive sensor or an inductive sensor.

An eddy current sensor does only depend on magnetic fields and doesn't depend on optical means. Thus the sensor is used to measure the clearance of the bearing through the layer of lubrication, for example, or in a situation with changing illumination.

A mechanical proximity sensor detects the distance between the mechanical surfaces very direct. Thus it is not disturbed by other influences, like dirt in the bearing, the state of the lubricant used, or the presence of light or electrical fields.

An ultrasonic sensor can also be used for other measurements in addition, like a detection of loose particles in the bearing or the detection of the properties of the lubrication in the bearing.

A photoelectric sensor is used for other measurements in addition, like a permanent control of the layer of lubrication in the bearing, or a continuous control of the sliding surface of the bearing shells.

An opto-electronic sensor is based on a measurement using light. Thus an opto-electric sensor needs less energy and, therefore, saves energy.

The bearing shells are made of metal. Thus a capacitive sensor or an inductive sensor measures the variation in the distance to the second bearing shell by detecting the metal surface of the bearing shell. Thus the measurement is very direct.

The specialist skilled in the art will appreciate selecting one of the sensors mentioned above, depending on the special details of the arrangement of the bearing and the bearing shells.

The sensor measuring the clearance is arranged at the first bearing shell, whereby the first bearing shell is connected to the stationary part of the wind turbine.

The sensor is arranged at the first bearing shell. Several sensors is used to measure the clearance of the bearing at different locations at the first bearing shell. For example, the clearance is measured at different sides of the bearing, or at different points along the circumference.

Thus the value of the clearance at different locations in the baring is detected. Thus a more complete knowledge about the clearance in the bearing is possible. Thus damage is avoided.

The sensor is attached to the stationary part of the bearing. Thus the sensor is connected by a wire. Thus the connection is more reliable. Thus the measurement values are more reliable.

No wireless sensor is needed, thus the sensor used is cheaper.

Service and maintenance at the sensor is easier to perform.

The sliding bearing arrangement comprises a pump to control the flow of the fluid in at least one of the circuits.

A pump is used to circulate the fluid in the circuits. A first pump is used in the first circuit. A second pump circulates the fluid in the second circuit.

A third pump is used to circulate the fluid in the third circuit.

Thus the circulation of the fluids in the circuits is regulated independently from each other.

The pumps are electrical pumps. The pumps are operated when they are needed and are switched off, when the difference in the temperature between the first and the second bearing shell is so low, that no compensation of the temperature is needed.

The pump is controlled according to the value of the clearance measured by the sensor, to achieve a certain predetermined clearance by transferring thermal energy between the bearing shells and the fluids.

The clearance between the first and the second baring shell is measured. If the clearance is within a certain predetermined range, no compensation of the temperature difference between the bearing shells is needed. Thus the pumps are switched off.

Thus energy is saved and the lifetime of the pumps is increased.

The first circuit is arranged in a groove in the surface of the first bearing shell, and/or the second circuit is arranged in a groove in the surface of the second bearing shell.

The first bearing shell comprises a groove. The groove is dimensioned in a way that a pipe of the first circuit is installed within the groove. The walls of the pipe of the first circuit and the walls of the groove of the first bearing shell are arranged in contact to each other.

Thus the contact surface between the first bearing shell and the first circuit is maximized. Thus the transfer of thermal energy, e.g. heat, from the first bearing shell to the first circuit is optimized.

Thus the first bearing shell is cooled or heated more efficiently.

In addition a medium, like a heat transfer paste, is used between the walls of the groove and the walls of the pipe of the first circuit.

The first circuit is arranged along the surface of the first bearing shell, and/or the second circuit is arranged along the surface of the second bearing shell.

The pipes of the first or the second circuit are thermally connected to the surface of the first or the second bearing shell. A groove is not needed, thus the bearing shell is not weakened be a groove in the material of the bearing shell.

The bearing comprises a bearing pad between the first bearing shell and the second bearing shell. The bearing pad is hydraulically movable, so that the clearance between the first bearing shell and the second bearing shell is adjustable.

The bearing pads are arranged movably. A hydraulic system comprises a reservoir of a hydraulic fluid at each bearing pad. When the pressure in the hydraulic fluid increases, the bearing pads are moved towards the bearing shell they slide along on. Thus the clearance between the bearing pad and the surface of the bearing shell is adjusted.

The reservoirs of the hydraulic system are connected. When a load is present in the bearing, the bearing shell pushes at one or more bearing pads. The hydraulic fluid is pressed out of the reservoir and into the reservoirs of the other bearing pads that experience less pressure from the bearing shell in this moment.

Thus the pressure at the bearing pads is equalized. A high pressure is compensated. Thus the wear at the bearing pads is equalized and the clearance, thus the thickness of the layer of lubrication is kept at a constant value.

When a temperature difference occurs between the first and the second bearing shell, the compensation of the temperature between the bearing shells needs a certain reaction time.

The hydraulic system and the adjustment of the bearing pads help to assist to keep a certain clearance in the bearing until the temperature between the bearing shells is compensated

BRIEF DESCRIPTION

Some of the embodiments will be described in detail, with reference to the following figures, wherein like designations denote like members, wherein.

The illustration in the drawings is in schematic form. It is noted that in different figures, similar or identical elements are provided with the same reference signs.

DETAILED DESCRIPTION

Figure 1:
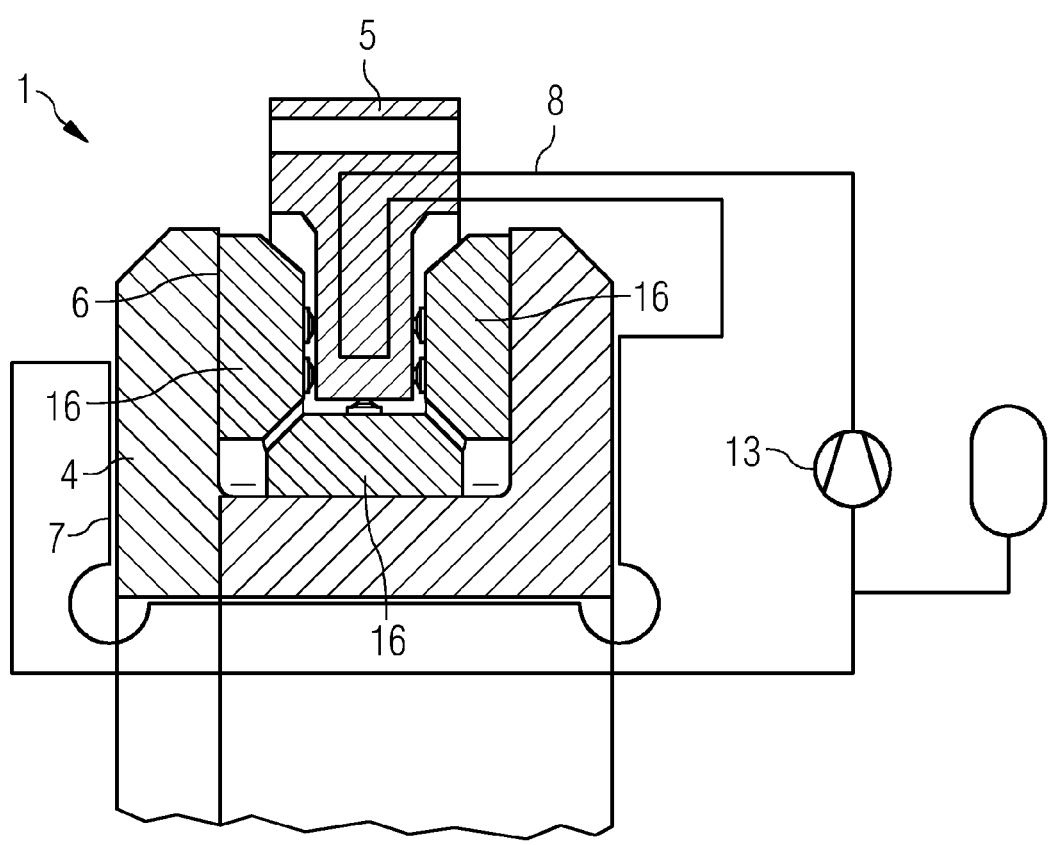
FIG. 1 shows a schematic view of a first embodiment of the bearing arrangement.

FIG. 1 shows a schematic view of a first embodiment of the bearing arrangement.

FIG. 1 shows a bearing arrangement 1 comprising a bearing. The bearing comprises a first bearing shell 4 and a second bearing shell 5. Bearing pads 16 are attached to the second bearing shell 5. During operation of the bearing the bearing pads 16 slide along to the surface of the first bearing shell 4.

A certain clearance 6 is provided between the first bearing shell 4 and the second bearing shell 5. The clearance 6 has to be kept within a certain range, to avoid damages at the bearing or the wind turbine, for example.

A first circuit 7 is arranged at the first bearing shell 4. The first circuit 7 comprises a first fluid. The first circuit 7 is in thermal contact to the first bearing shell 4, so that thermal energy, heat for example, is transferred between the first bearing shell 4 and the first fluid. Thus the first bearing shell 4 is cooled or heated by the first fluid.

A second circuit 8 is arranged at the second bearing shell 5. The second circuit 8 comprises a second fluid. The second circuit 8 is in thermal contact to the second bearing shell 5. Thus heat is transferred between the second bearing shell 5 and the second fluid. Thus the second bearing shell 5 is cooled or heated by the second fluid in the second circuit 8.

The first circuit 7 and the second circuit 8 are connected in a way that the first fluid flows from the first circuit 7 to the second circuit 8 and back to the first circuit 7. Also the second fluid flows from the second circuit 8 to the first circuit 7 and back to the second circuit 8.

Thus heat is transferred from the first circuit 7 to the second circuit 8 or form the second circuit 8 to the first circuit 7.

Thus heat is transferred between the first bearing shell 4 and the second bearing shell 5. Thus a difference in the temperature between the first bearing shell 4 and the second bearing shell 5 is compensated.

A pump 13 is installed between the first circuit 7 and the second circuit 8 to pump the fluid through the circuits.

A rotary unit is used to transfer the fluid between the first bearing shell 4 and the second bearing shell 5. The rotary unit is not shows in the figure.

Figure 2:
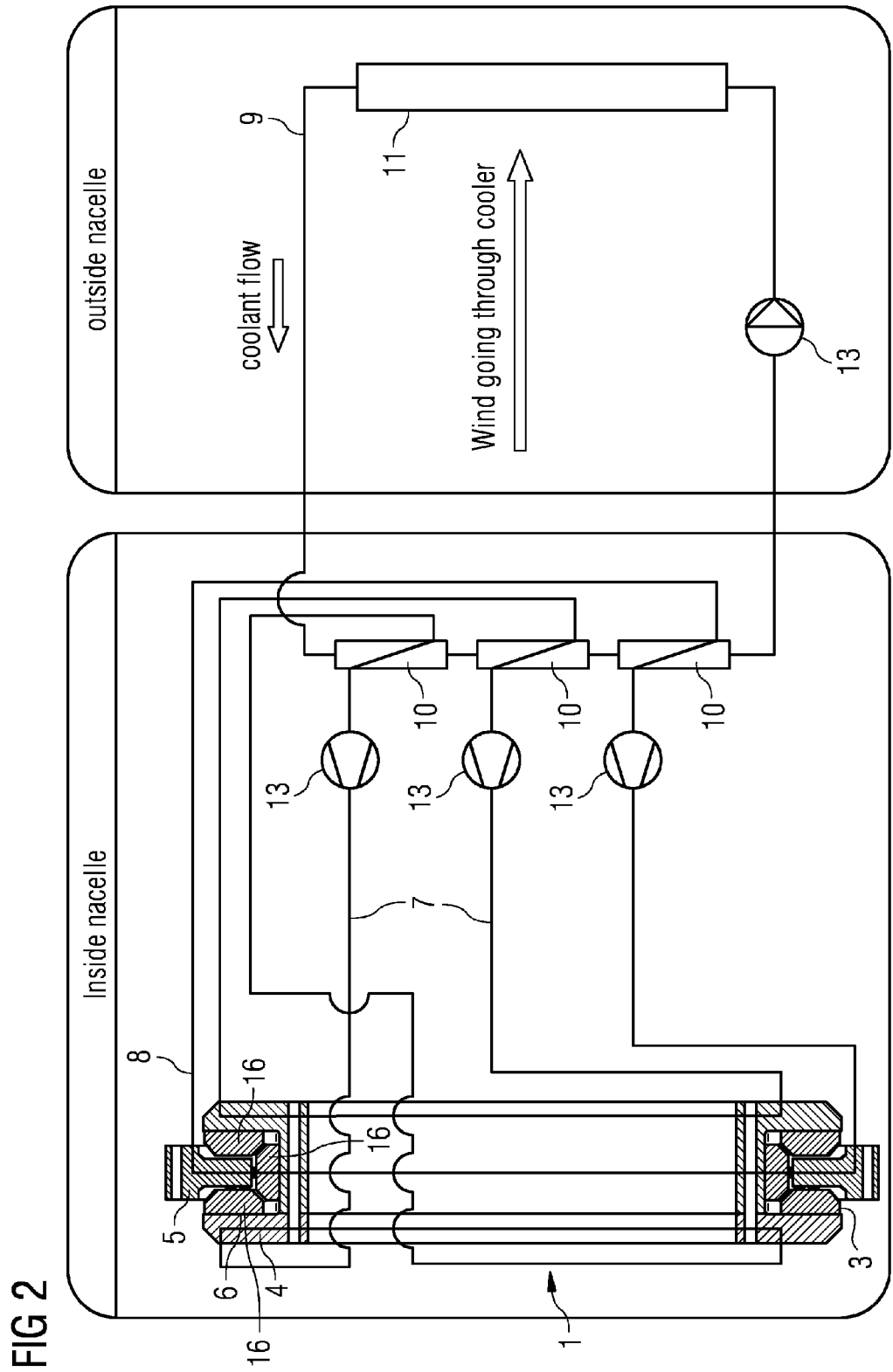
FIG. 2 shows a second embodiment of the bearing arrangement.

FIG. 2 shows a second embodiment of the bearing arrangement.

FIG. 2 shows a bearing arrangement 1 with a bearing 3. The bearing 3 comprises a first bearing shell 4 and a second bearing shell 5. Bearing pads 16 are arranged between the first bearing shell 4 and the second bearing shell 5.

A first circuit 7 is arranged at the first bearing shell 4 to cool or heat the first bearing shell 4. In this embodiment the first circuit 7 is arranged in two loops along the first bearing shell 4.

A second circuit 8 is arranged at the second bearing shell 5, to cool or heat the second bearing shell 5.

The first circuit 7 and the second circuit 8 are connected via a heat exchanger 10.

The heat exchanger 10 is connected to a third circuit 9. The third circuit 9 comprises a third fluid. A pump 13 pumps the third fluid within the third circuit 9.

The first circuit 7 and the second circuit 8 are connected via the third circuit 9. Thus a difference in the temperature of the first fluid and the second fluid is compensated by the third fluid.

The third circuit 9 is connected to a cooler 11. The cooler 11 is cooled by ambient air, moving though the cooler. Thus the third fluid is cooled by the ambient air through the cooler 11.

Thus the compensated common temperature of the first and the second fluid is cooled via the third fluid and the cooler 11.

The first and the second circuits 7, 8 are, in this embodiment, connected via separate heat exchangers 10 to the third circuit 9. The circuits can also be connected via one common heat exchanger 10.

In the use of the bearing arrangement 1 in a wind turbine, the bearing arrangement 1 is arranged within the nacelle of the wind turbine. The cooler 11 is arranged outside the nacelle, to transfer the heat from the bearing to the ambient air. Thus the third circuit 9 is arranged partially inside and partially outside of the nacelle of the wind turbine.

In this figure the first, second, and third circuit 7, 8, 9 are displayed in a schematic way that illustrates which part of the bearing 3 is cooled by which circuit. The alignment of the circuits in respect to the bearing shells 4, 5 does not represent a de facto alignment.

Figure 3:
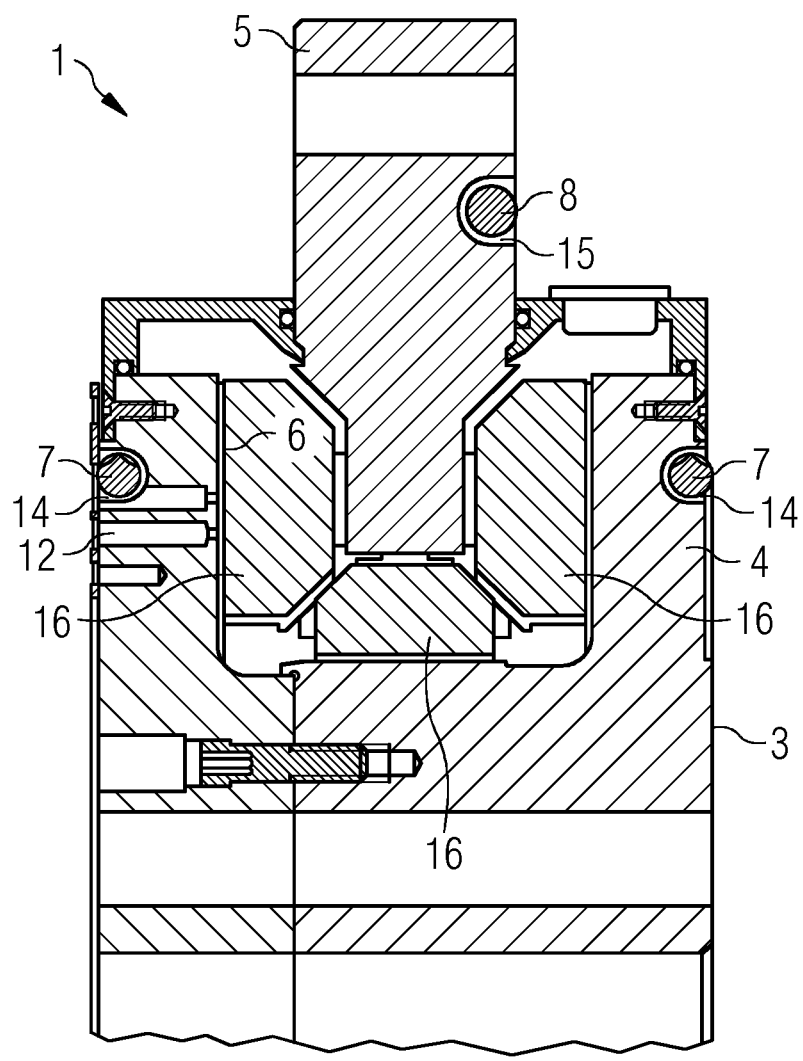
FIG. 3 shows a detailed view of the bearing arrangement.

FIG. 3 shows a detailed view of the bearing arrangement.

FIG. 3 shows a detailed view of the bearing arrangement 1. The bearing arrangement 1 comprises a first bearing shell 4 and a second bearing shell 5. Bearing pads 16 are arranged between the first bearing shell 4 and the second bearing shell 5.

The first bearing shell 4 comprises a groove 14 in the surface of the first bearing shell 4. In this embodiment two grooves 14 are shown at the sides of the first bearing shell 4.

The first circuit 7 is arranged in the grooves 14. Thus the contact area between the first circuit 7 and the first bearing shell 4 is increased. Thus the transfer of heat between the bearing shell 4 and the first fluid in the first circuit 7 is optimized.

The second bearing shell 5 comprises a groove 15. The second circuit 8 is arranged in the groove 15 to increase the contact surface between the second bearing shell 5 and the second circuit 8. Thus the transfer of heat between the second bearing shell 5 and the second fluid in the second circuit 8 is optimized.

The first bearing shell 4 comprises a sensor 12. The sensor is used to measure the clearance 6 between the first bearing shell 4 and the second bearing shell 5.

In this embodiment bearing pads 16 are arranged between the bearing shells 4, 5. Thus the clearance 6 measured, is the clearance between the bearing pads 16 and the first bearing shell 4.

In this embodiment the sensor 12 is arranged to measure the distance between the first bearing shell 4 and the bearing pad 16 at one side of the bearing. Additional sensors 12 are used to measure the clearance 6 between the bearing pads 16 and other surfaces of the first bearing shell 4.

The sensor 12 is an eddy current sensor, a mechanical proximity sensor, a ultrasonic sensor, a photoelectric sensor, an opto-electronic sensor, a capacitive sensor or an inductive sensor, for example.

Figure 4:
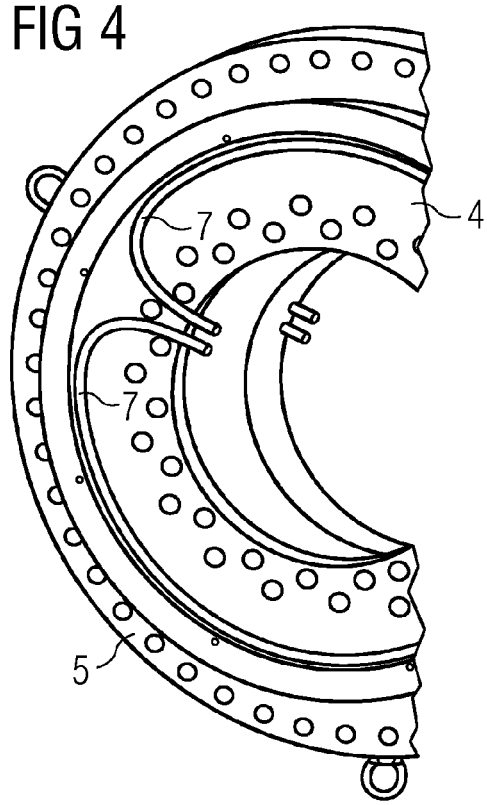
FIG. 4 shows a detail of the first circuit.

FIG. 4 shows a detail of the first circuit 4.

FIG. 4 shows a detail of a preferred embodiment of the bearing. The bearing comprises a first bearing shell 4 and a second bearing shell 5. The first circuit 7 comprises a pipe for the first fluid. The pipe of the first circuit 7 is arranged along the surface of the first bearing shell 4.

Figure 5:
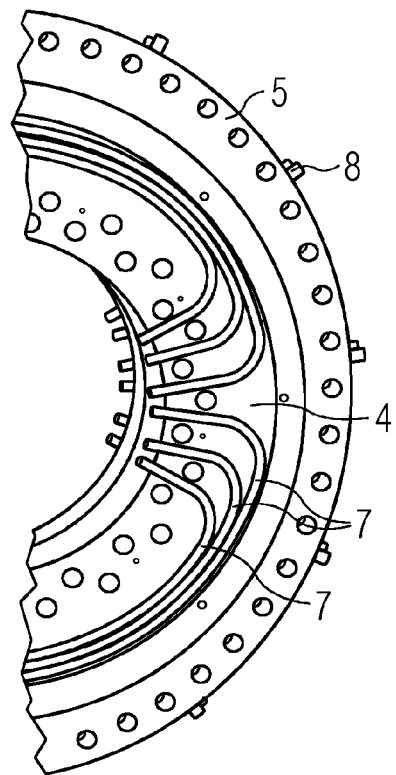
FIG. 5 shows another embodiment of the first circuit.

FIG. 5 shows another embodiment of the first circuit 7.

FIG. 5 shows a detail of a bearing arrangement. The bearing comprises a first bearing shell 4 with a first circuit 7 and a second bearing shell 5 with a second circuit 8.

The first circuit 7 is arranged at the surface of the first bearing shell 4. The first circuit 7 comprises three conduits that are arranged parallel.

The second circuit 8 is arranged in the radially outer surface of the second bearing shell 5. In this figure only the connections to the second circuit 8 are shown.

Figure 6:
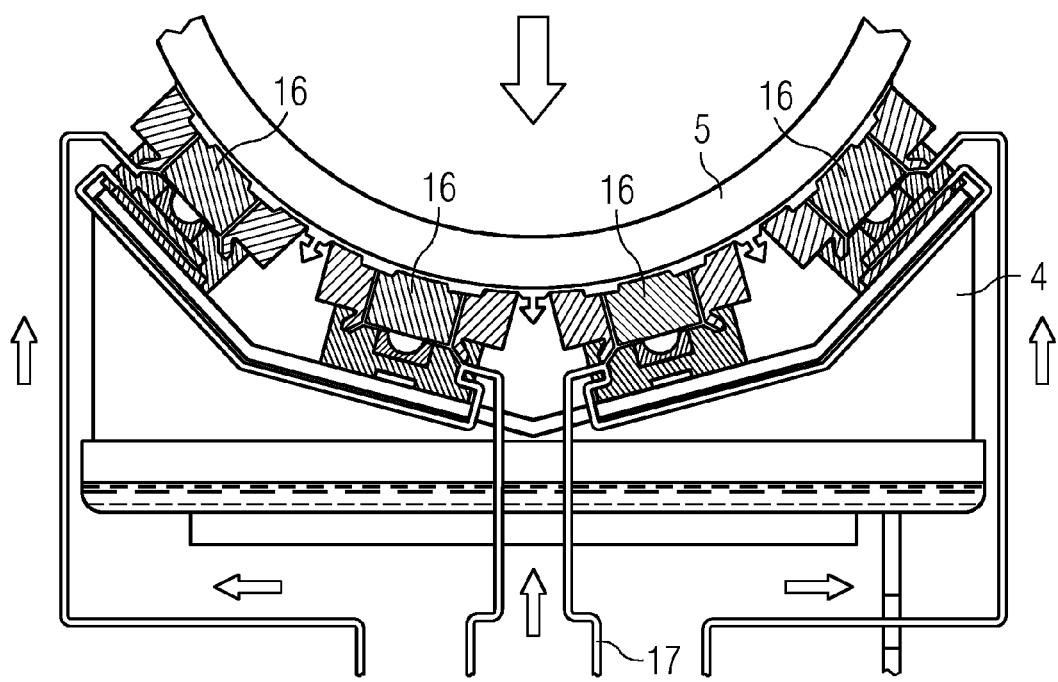
FIG. 6 shows a schematic view of a hydraulic system.

FIG. 6 shows a schematic view of a hydraulic system.

FIG. 6 shows a schematic view of a hydraulic system used to adjust the bearing pads 16 to a variable load distribution in the bearing. The bearing comprises a first bearing shell 4 and a second bearing shell 5. The second bearing shell 5 rotates in respect to the first bearing shell 4. The bearing pads 16 are attached to the first bearing shell 4. A layer of lubrication is provided between the bearing pads 16 and the second bearing shell 5 to minimize the friction between the bearing pads 16 and the moving bearing shell 5. A certain clearance is present between the first and the second bearing shell 4, 5. The clearance has to be kept at a certain value, to avoid a disruption of the layer of lubrication.

Due to gusts in the wind at the rotor of the wind turbine, the load distribution in the bearing is changing. Thus the clearing in the bearing is changing. This bears the danger that the clearance in the bearing gets too small, thus the layer of lubrication disrupts.

The hydraulic system 17 balances the load present on the single bearing pads 16. Each of the bearing pads 16 rests on a reservoir of hydraulic fluid. The reservoirs are connected.

If there is a higher load on one bearing pad 16, the hydraulic fluid is pressed out of the reservoir of this bearing pad 16 and flows to the reservoirs of the other bearing pads 16. The other bearing pads 16 get lifted up until the load distribution between the bearing pads 16 is balanced again.

Thus the bearing pads 16 are adjusted according to the load distribution present in the bearing. Thus the clearance in the bearing, between the bearing pads 16 and the second bearing shell 5 is adjusted. Thus the lubrication layer experiences an equal load. Thus the danger of a disruption of the layer of lubrication is minimized.

Figure 7:
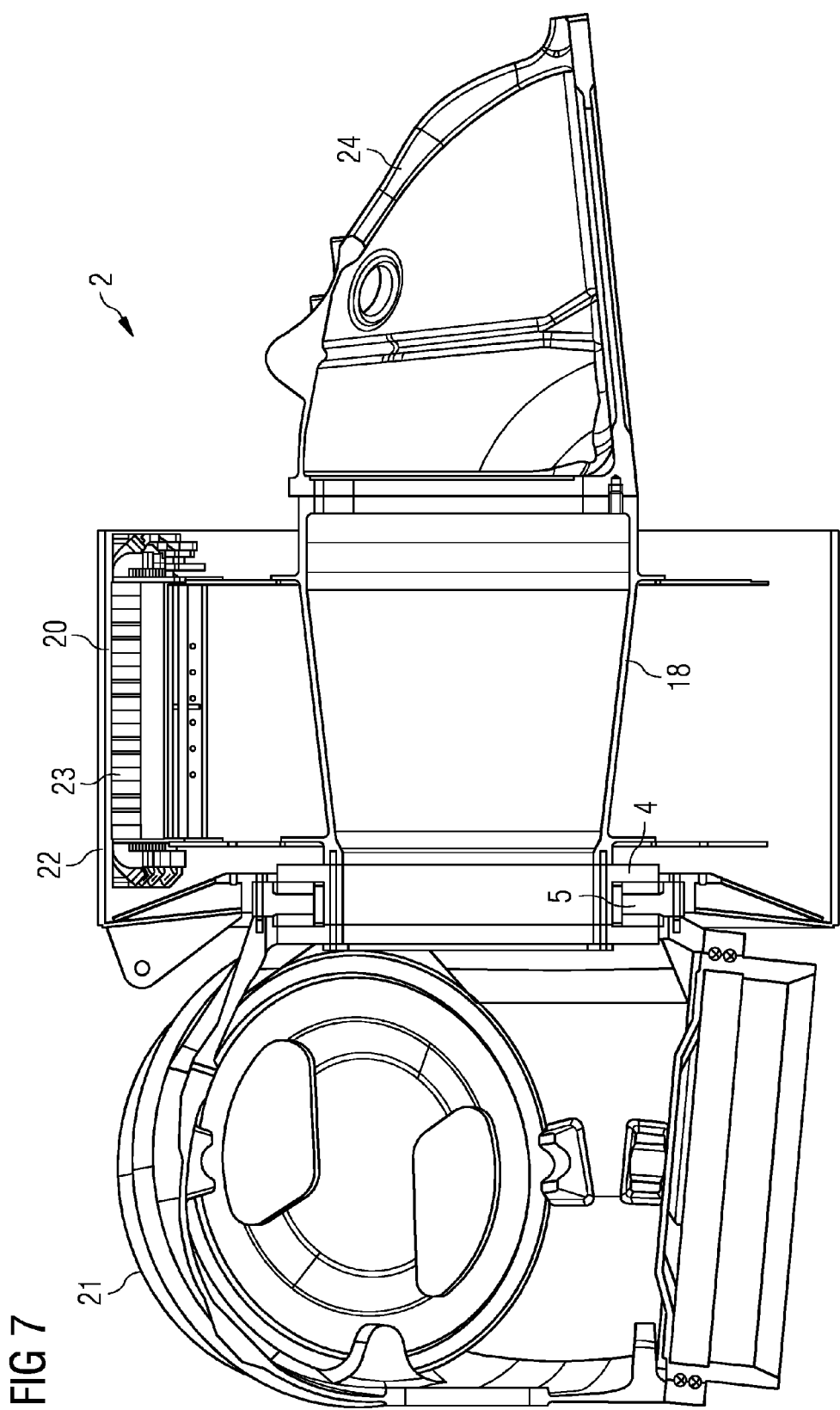
FIG. 7 shows a cut through a direct driven wind turbine.

FIG. 7 shows a cut through a direct driven wind turbine.

FIG. 7 shows a cut through a direct driven wind turbine 2. The hub 21 of the wind turbine is prepared to receive the rotor blades. The hub 21 is connected to the rotor of the electrical generator 22.

The hub 21 and the rotor of the electrical generator 22 are part of the rotatable part of the wind turbine 2. The rotatable part of the wind turbine 2 is connected via a bearing to the stationary part 18 of the wind turbine 2.

The stationary part 18 of the wind turbine 2 comprises the stator 23 of the electrical generator and the support structure 24 that connects the electrical generator and the hub 21 to the tower of the wind turbine.

The bearing comprises a first bearing shell 4. The first bearing shell 4 is connected to the stationary part 18 of the wind turbine 2. The bearing comprises a second bearing shell 5 that is connected to the rotating part of the wind turbine 2.

The electrical generator comprises an air gap 20 between the stator 23 and the rotor 22. The size of the air gap 20 depends on the tolerance in the bearing. If the tolerance in the bearing, between the first bearing shell 4 and the second bearing shell 5 is too high, the tolerance in the size of the air gap 20 is too big. Thus the air gap 20 might get too small, and the rotor 22 of the electrical generator gets in contact to the stator 23. This leads to a damage of the electrical generator.

The tolerance in the sliding bearing depends on the clearance between the first bearing shell 4 and the second bearing shell 5. The tolerance between the bearing shells has to be kept within a certain predetermined range.

Figure 8:
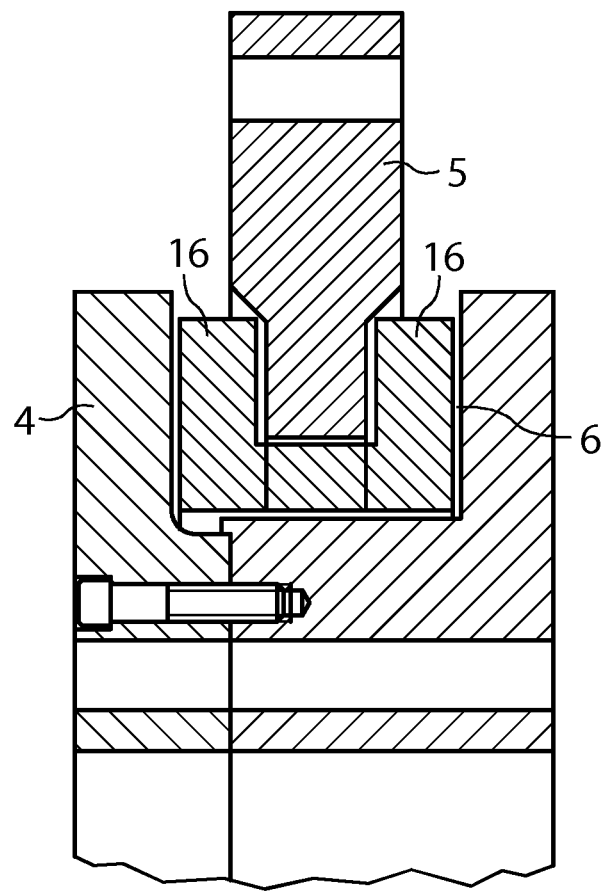
FIG. 8 shows a cut through a bearing of the state of the art.

FIG. 8 shows a cut through a bearing of the state of the art.

The bearing is a ring shaped bearing and the cut is an axial cat through the ring.

The bearing comprises a first bearing shell 4 and a second bearing shell 5. The bearing shells 4, 5 are arranged in a way that they rotate in respect to each other when the bearing is in operation.

For example, the first bearing shell 4 is attached to the stationary part of a wind turbine. The second bearing shell 5 is rotating in respect to the first bearing shell 4, to allow the rotation of the rotor of the wind turbine.

The bearing is a sliding bearing. The first and the second bearing shell 4, 5 are separated by bearing pads 16. Thus the friction between the first and the second bearing shell 4, 5 is reduced, and the wear in the bearing is minimized.

The bearing pads 16 are attached to three sides of the second bearing shell 5. The bearing pads 16 move along the first bearing shell 4 during operation. A direct contact between the bearing pads 16 and the first bearing shell 4 is avoided by a layer of lubrication. A layer of lubrication is provided between the bearing pads 16 and the first bearing shell 4.

The bearing comprises a certain clearance 6 between the bearing pads 16 of the second bearing shell 5 and the first bearing shell 4.

The clearance 6 depends on the mechanical dimension of the bearing and the temperature of the bearing shells 4, 5.

The clearance 6 can either be too big, when the first bearing shell 4 is warmer than the second bearing shell 5. Or the clearance 6 is too small, when the second bearing shell 5 is warmer than the first bearing shell 4.

When the clearance 6 is too big, the tolerance of the bearing is too high. This can lead to mechanical problems and damages in the wind turbine. When the clearance 6 is too small, the layer of lubrication might get too thin and the bearing pads 16 can get in contact with the first bearing shell 4. This leads to a high wear and damage in the bearing.

During a period of non-operation, when the wind turbine is stopped for service for example, the bearing pads 16 rest on the first bearing shell 4. Thus the bearing pads 16 are in direct contact with the first bearing shell 4.

During the start up of the wind turbine the bearing starts to rotate. A layer of lubrication is not present in the bearing at the start of the rotation. Thus the bearing pads 16 slide along the surface of the first bearing shell 4. Thus the friction between the bearing pads 16 and the first bearing shell 4 is very high. Thus heat is generated.

The heat generated increases the temperature of the bearing shells 4, 5. Depending on the construction of the wind turbine, one of the two bearing shells 4, 5 will increase quicker in temperature. Thus the bearing shells will have a different temperature, thus the clearance in the bearing will change. Thus damages in the wind turbine or in the bearing are possible to occur.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also Elements described in association with different embodiments may be combined. It should also be noted that reference signs in the claims should not be construed as limiting the scope of the claims.

The invention claimed is:

1. A sliding bearing arrangement of a direct driven wind turbine, comprising:
    a bearing, having a first bearing shell and a second bearing shell,
    whereby the first bearing shell and the second bearing shell are arranged rotatable in respect to each other,
    wherein a certain predetermined clearance is present between the first bearing shell and the second bearing shell, while the bearing is in rotation,
    a first circuit comprising a first fluid, while the first circuit is in thermal contact with the first bearing shell,
    a second circuit comprising a second fluid, while the second circuit is in thermal contact with the second bearing shell,
    whereby the first circuit and the second circuit are coupled in a way that a difference in the temperature between the first bearing shell and the second bearing shell is compensated via the first and the second fluid, thus the clearance is kept within a predetermined range.

2. The sliding bearing arrangement according to claim 1 wherein the first circuit and the second circuit are coupled by a connection thus the first fluid flows from the first circuit to the second circuit and back to the first circuit, while the second fluid flows from the second circuit to the first circuit and back to the second circuit.

3. The sliding bearing arrangement according to claim 1, wherein the fluid is water, air, oil or a gaseous medium.

4. The sliding bearing arrangement according to claim 1 comprising a third circuit with a third fluid, whereby the first circuit is coupled to the second circuit via the third circuit thus the difference in the temperature of the first fluid and of the second fluid is compensated by the third fluid.

5. The sliding bearing arrangement according to claim 4 wherein the first circuit and the second circuit are coupled via a heat exchanger to the third circuit to transfer the thermal energy of the first fluid and of the second fluid to the third fluid.

6. The sliding bearing arrangement according to claim 5, wherein the third circuit comprises a cooler, which is arranged and prepared to cool the third fluid.

7. The sliding bearing arrangement according to claim 6 wherein the bearing is arranged within the nacelle of the wind turbine and the cooler is arranged outside of the nacelle, while the cooler is arranged and prepared to cool the third fluid by an ambient airflow.

8. The sliding bearing arrangement according to claim 1 wherein the clearance of the bearing is measured by a sensor.

9. The sliding bearing arrangement according to claim 8 wherein the sensor measuring the clearance is an eddy current sensor, a mechanical proximity sensor, an ultrasonic sensor, a photoelectric sensor, an opto-electronic sensor, a capacitive sensor or an inductive sensor.

10. The sliding bearing arrangement according to claim 8 wherein the sensor measuring the clearance is arranged at the first bearing shell, whereby the first bearing shell is connected to the stationary part of the wind turbine.

11. The sliding bearing arrangement according to claim 1, comprising a pump to control the flow of the fluid in at least one of the circuits.

12. The sliding bearing arrangement according to claim 11 wherein the pump is controlled according to the value of the clearance measured by the sensor, to achieve a certain predetermined clearance by transferring thermal energy between the bearing shells and the fluids.

13. The sliding bearing arrangement according to claim 1, wherein at least one of:
    that the first circuit is arranged in a groove in the surface of the first bearing shell; and that the second circuit is arranged in a groove in the surface of the second bearing shell.

14. The sliding bearing arrangement according to claim 1, wherein at least one of: that the first circuit is arranged along a surface of the first bearing shell, that the second circuit is arranged along a surface of the second bearing shell.

15. The sliding bearing arrangement according to claim 1, wherein the bearing comprises a bearing pad between the first bearing shell and the second bearing shell, and that the bearing pad is hydraulically movable, so that the clearance between the first bearing shell and the second bearing shell is adjustable.

\* \* \* \* \*